Nov. 8, 1938.  M. L. KOCHHEISER ET AL  2,136,344
TENSION TESTING MACHINE
Original Filed Feb. 23, 1923
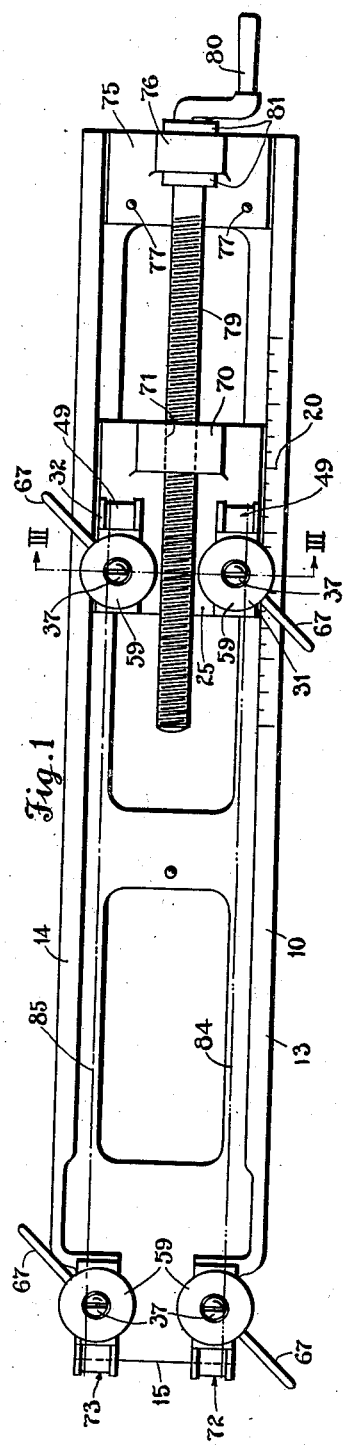
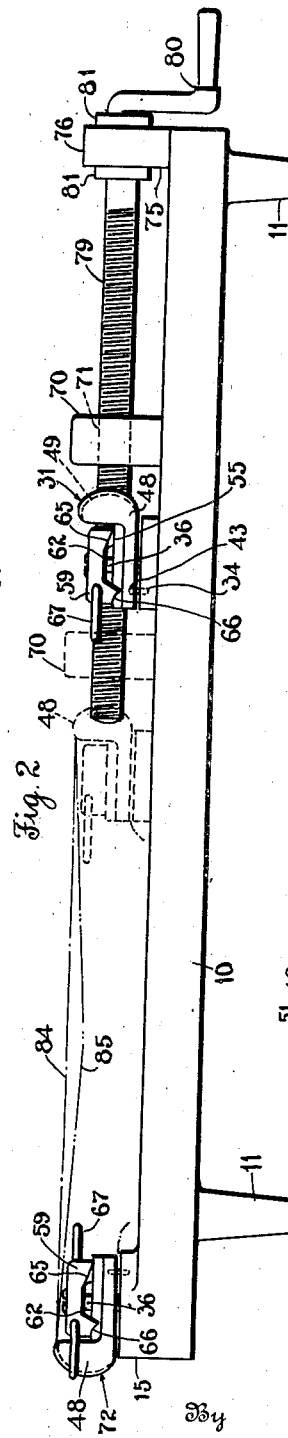
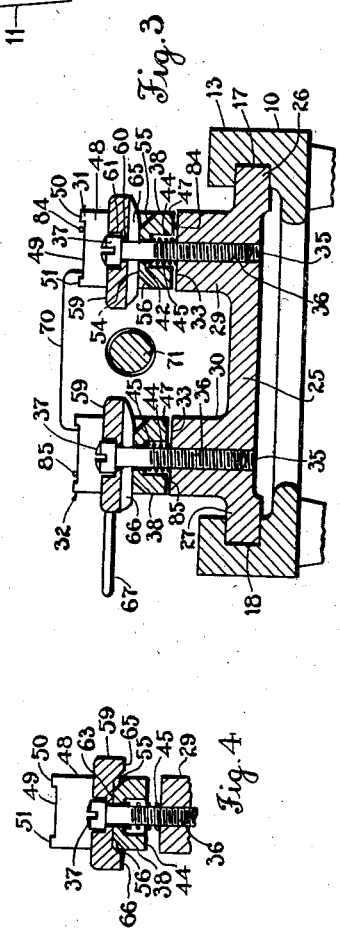
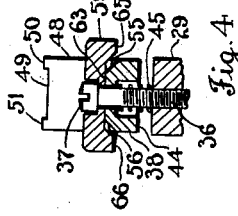
Inventor
Max L. Kochheiser
Samuel A. Steere
Attorney Patented Nov. 8, 1938

2,136,344

UNITED STATES PATENT OFFICE 2,136,344

TENSION TESTING MACHINE

Max L. Kochheiser and Samuel A. Steere, Akron, Ohio, assignors to Wingfoot Corporation, Wilmington, Del., a corporation of Delaware Continuation of application Serial No. 256,247, February 23, 1928. This application September 29, 1934, Serial No. 746,230. In Canada December 29, 1928

5 Claims. (Cl. 73—51)

Our invention relates to a testing machine and it has particular relation to a machine for testing the tensile strength and elasticity of extensible materials. This application is a continuation of our pending application, Serial No. 256,247, filed February 23, 1928.

One object of the invention is to provide a machine for simultaneously comparing the elastic properties of a plurality of materials.

A further object of the invention is to provide a machine for simultaneously comparing the tensile strengths of a plurality of elastic materials.

A still further object of the invention is to provide a novel means for fastening the ends of elastic materials to be tested.

For a better understanding of the invention, references may now be had to the accompanying drawing, forming a part of this specification, in which:—

Fig. 1 is a plan view of a testing apparatus, constructed according to the invention;

Fig. 2 is an elevational view of the construction shown by Fig. 1;

Fig. 3 is a cross-sectional view, on a larger scale, taken substantially along the lines III—III of Fig. 1; and Fig. 4 is a cross-sectional view of one of the clamping members in its inoperative position.

In practicing the invention we provide a base 10 supported at each end by a plurality of legs 11. The upper surface of the base is provided with longitudinally disposed spaced flanges 13 and 14 which are commensurate with the length of the base. The flanges 13 and 14 merge at one end into an enlarged portion 15, but remain in spaced relation at their other ends. Longitudinal guides 17 and 18, preferably of channel shape, are formed on the inner sides of the flanges to accommodate a slidable cross-head 25. A graduated scale 20 is imprinted or etched upon the upper surface of the flange 13 to measure the movement of the cross-head, which is mounted upon the base 10 by means of the lugs 26 and 27 which slide within the guides 17 and 18 in the flanges 13 and 14 respectively. Since the flanges are spaced at one end, it is apparent that the cross-head is removable from the base. On its upper surface the cross-head is formed with a pair of integral blocks 29 and 30 which support clamps 31 and 32, respectively. These clamps are alike in construction, and it is apparent, therefore, that the same reference numerals may be employed in describing both.

Each block has a pin 34, (shown in dotted lines in Fig. 2) which projects above the upper surface 33 thereof, and a threaded opening 35 centrally located in the block is spaced from the pin. A bolt 36, having a slotted head 37, is threaded into the opening 35, with its head 37 substantially spaced from the surface 33. A lamping member 38 having an opening 42 is mounted loosely upon the bolt 36, and is provided with an aperture 43, which slidably receives the pin 34. Hence the clamping member is prevented from rotating but is free to move vertically, relative to the block. The aperture 42 is enlarged at its lower end, as indicated at 44, to receive a helical spring 45 which normally abuts the surface 33 of the block and urges the clamping member upwardly.

The lower side of the clamping member 38 has a plain surface 47 which is adapted to cooperate in clamping relation with the surface 33 of the block. One end 48 of the clamping member extends vertically, and is provided with a curved surface 49 which merges into the surface 47. The surface 49 is bounded on its sides, by ribs 50 and 51 whereby a cord, or the like, easily is maintained upon the surface. The upper side of the clamping member is provided with a horizontal surface 54, and laterally inclined surfaces 55 and 56, disposed on opposite sides of the surface 54.

A cam 59 is mounted rotatably upon the bolt 36, and the lower side thereof is formed with a pair of diametrically disposed horizontal surfaces 62 and 63 which normally rest upon the horizontal surface 54 of the clamping member. Between the surfaces 62 and 63, cam surfaces 65 and 66 also are diametrically disposed and have their lowest points normally below the surfaces 62 and 63.

It is apparent that when the cam is turned on the bolt 36, from its position shown in Fig. 4, the cam surfaces 65 and 66 ride over the inclined surfaces 55 and 56 and force the clamping member 38 downwardly. Continued turning of the cam brings the lowermost points of the cam surfaces into contacting relation with the horizontal surface 54, causing the clamping member to be locked in its lowermost position adjacent the base 29 of the cross-head.

To facilitate turning of the cam, a handle 67 is secured thereto. The clamping member in its lowermost position is adapted to secure a cord, or the like, between the surfaces 33 and 47. The distance between the clamping member 38 and the block 29 may be varied by adjustment of the screw 36 whereby materials of different thicknesses may be clamped securely.

A lug 70 having a screw threaded opening 71 therein is formed on one end of the cross-head 25. The axis of the opening 71, extended, passes centrally and longitudinally between the clamps 31 and 32.

The enlarged portion 15 of the base also is provided with clamps 72 and 73, which are constructed in the same manner as the clamps 31, 32, and it is therefore unnecessary that a description of them in detail be given. It will be observed that the clamp 72 is in alignment with the clamp 31, and that the clamp 73 is in alignment with the clamp 32.

A block 75 having a journal 76 is provided on the end of the base 10 and is secured thereto by the rivets 77. A screw 79, having a crank 80 formed on one end thereof, is rotatably mounted in the journal 76, and is held against longitudinal movement relative thereto by collars 81. The threaded end of the screw operatively engages the threaded opening 71 in the lug 70 and is disposed substantially midway between the clamps 31 and 32. By rotating the crank 80 the cross-head 25 is moved longitudinally of the base 10. The distance the cross-head is moved, may be measured if desired, by means of the scale 20 on the flange 13.

In operating the apparatus, two cords 84 and 85, the relative strength and elasticity of which are to be tested, are fastened between the clamps 31 and 72, and 32 and 73, respectively as shown in Fig. 1. Then the screw 79 is so rotated as to move the block 25 in a direction away from the clamps 72 and 73, thereby elongating the cords. Continued rotation of the screw eventually will break one of the cords first unless both cords should be of the same tensile strength and elasticity. It is therefore apparent that cords of unequal tensile strength may be readily tested, and their comparative strengths demonstrated.

Before the breaking point of either cord is reached, however, the movement of the screw may be reversed and the cords allowed to sag. If the cords have equal elastic properties, they will sag equally; but if one of the cords has greater elastic properties than the other it will sag much less than the other. Obviously this stretching and sagging of the cords within their elastic limits may be repeated as often as necessary in order to accentuate the relative elasticity of the cords.

From the foregoing description it will be apparent that the apparatus disclosed is peculiarly adapted to be employed in demonstrating comparatively the qualities of different kinds of cords, and that the size and construction of the apparatus is such that it may be transported in conjunction with personal baggage without material inconvenience.

Although we have illustrated only the preferred form which the invention may assume and have described that form in detail, it will be apparent to those skilled in the art that the invention is not so limited but that various modifications may be made therein without departing from the spirit of the invention or from the scope of the appended claims.

We claim:

1. A testing machine comprising a base having guides therein, a cross-head slidable in the guides, a plurality of clamps on the base and cross-head, each of the clamps having an arcuately upwardly extending surface whereby strands of material secured to the clamps are directed upwardly away from the base, and means for moving the cross-head to test the comparative elasticities and strengths of the material.

2. In a testing apparatus a fastening device comprising a base, a bolt and pin on the base, a clamping member slidably mounted on the bolt and pin, and having a lower clamping surface and an arcuately curved end surface merging with the clamping surface, a cam rotatably mounted on the bolt and having a cam surface adapted to coact with the upper surface of the clamping member, the head of the bolt abutting the outer surface of the cam for maintaining the parts in assembled relation.

3. In a testing apparatus, a fastening device comprising a base, a headed bolt thereon, a clamping member loosely mounted on the bolt and having resilient means spacing it from the base, said member having an arcuately upwardly extending surface for upwardly directing strands of material clamped between the base and member, and a cam loosely mounted on the bolt between the head of the bolt and the clamping member, and having a cam surface adapted to coact with the upper surface of the clamping member to force the latter member toward the base.

4. In a testing machine, in combination, a base, a plurality of clamps on the base adapted to secure and hold stationary one end of each of a plurality of cords and the like, a member movably mounted on said base, a plurality of clamps on said member adapted to secure each of said cords at a point spaced from said ends to said member, and means for moving said member to simultaneously and uniformly tension each of said cords whereby their comparative strengths and elasticities may be determined.

5. In a testing machine, in combination, a base, a plurality of clamps on the base adapted to secure and hold stationary one end of each of a plurality of cords and the like, a member movably mounted on said base, a plurality of clamps on said member adapted to secure each of said cords at a point spaced from said ends to said member, and means for moving said member to simultaneously and uniformly tension each of said cords whereby their comparative strengths and elasticities may be determined, each of said clamps being provided with an arcuate upwardly extending surface whereby cords secured to the clamps are directed upwardly away from the base.

MAX L. KOCHHEISER.
SAMUEL A. STEERE.